United States Patent [19]

Matsumoto et al.

[11] Patent Number: 4,563,685
[45] Date of Patent: Jan. 7, 1986

[54] RETURN ROUTE INDICATION DEVICE FOR AUTOMOTIVE VEHICLES

[75] Inventors: Muneaki Matsumoto, Okazaki; Akira Kuno, Obu; Koji Numata, Toyokawa, all of Japan

[73] Assignee: Nippon Soken, Inc., Nishio, Japan

[21] Appl. No.: 446,873

[22] Filed: Dec. 6, 1982

[30] Foreign Application Priority Data

Dec. 7, 1981 [JP] Japan .............................. 56-195563

[51] Int. Cl.$^4$ .............................................. G08G 1/12
[52] U.S. Cl. .................................... 340/995; 364/436; 364/444
[58] Field of Search ....................... 340/988, 995, 996; 343/452, 451, 457; 364/444, 436, 460, 457, 449, 424

[56] References Cited

U.S. PATENT DOCUMENTS

| | | | |
|---|---|---|---|
| 3,845,289 | 10/1974 | French | 340/996 |
| 3,925,641 | 12/1975 | Kashio | 340/988 |
| 4,028,531 | 6/1977 | Cottin | 340/995 |
| 4,190,819 | 2/1980 | Burgyan | 340/996 |
| 4,242,731 | 12/1980 | Mizote | 340/988 |
| 4,367,453 | 1/1983 | Kuno | 340/995 |
| 4,399,615 | 8/1983 | Matsumoto | 340/995 |
| 4,403,291 | 9/1983 | Von Tomkewitsch | 340/995 |

Primary Examiner—James J. Groody
Attorney, Agent, or Firm—Cushman, Darby & Cushman

[57] ABSTRACT

A device for indicating information on the return route for an automotive vehicle includes a memory and control portion for successively storing the detected direction signals and the detected distance signals on the route to a destination and successively generating indication signals to the extent of a predetermined distance in the forward direction on the return route on the basis of the stored detected direction signals and the distance signals. The device also includes a circuit for correcting the difference between the distance of the vehicle travel on the route to the destination and the return route, so that the correct indication of information of the return route is displayed on a display device such as a CRT.

6 Claims, 6 Drawing Figures

RETURN ROUTE INDICATION DEVICE FOR AUTOMOTIVE VEHICLES

BACKGROUND OF THE INVENTION

1. Field of the Invention

The present invention relates to a return route indication device for an automotive vehicle.

2. Description of the Prior Art

When a person drives an automotive vehicle to and from a certain destination, the person usually guides himself to the destination by means of road signs and/or road maps, but returns to the starting point by memory. It is sometimes difficult, however, for the driver to find the correct return route because, for example, of differences in the scenery along the two routes as viewed by the driver.

A system for indicating information on the return route has been proposed in which the information regarding left or right turns at intersections on the route to the destination is stored together with information on the distance of travel in a memory device. The stored information is read out from the memory device and displayed on the return route. This system, however, has been shown to work unsatisfactorily in practice.

SUMMARY OF THE INVENTION

It is the main object of the present invention to provide, for an automotive vehicle, an automatic indication of reliable information defining a return route from a destination which return route corresponds to the route previously taken to the destination.

In accordance with the present invention there is provided a device for indicating information on the return route for an automotive vehicle. The device comprises a direction detecting portion mounted on the vehicle for generating a direction detection signal corresponding to the direction of travel of the vehicle; a distance detecting portion for generating a distance signal corresponding to the distance of travel of the vehicle; a memory and control portion for successively storing the detected direction signals and the detected distance signals on the initial route and successively generating indication signals to the extent of a predetermined distance in the forward direction on the return route on the basis of the stored detected direction signals and distance signals; a display portion for displaying the information to the extent of a predetermined distance in the forward direction; and a circuit for correcting the difference between the distance of travel of the vehicle on the route to the destination and that on the return route.

DESCRIPTION OF THE PREFERRED EMBODIMENTS

Figure 1:
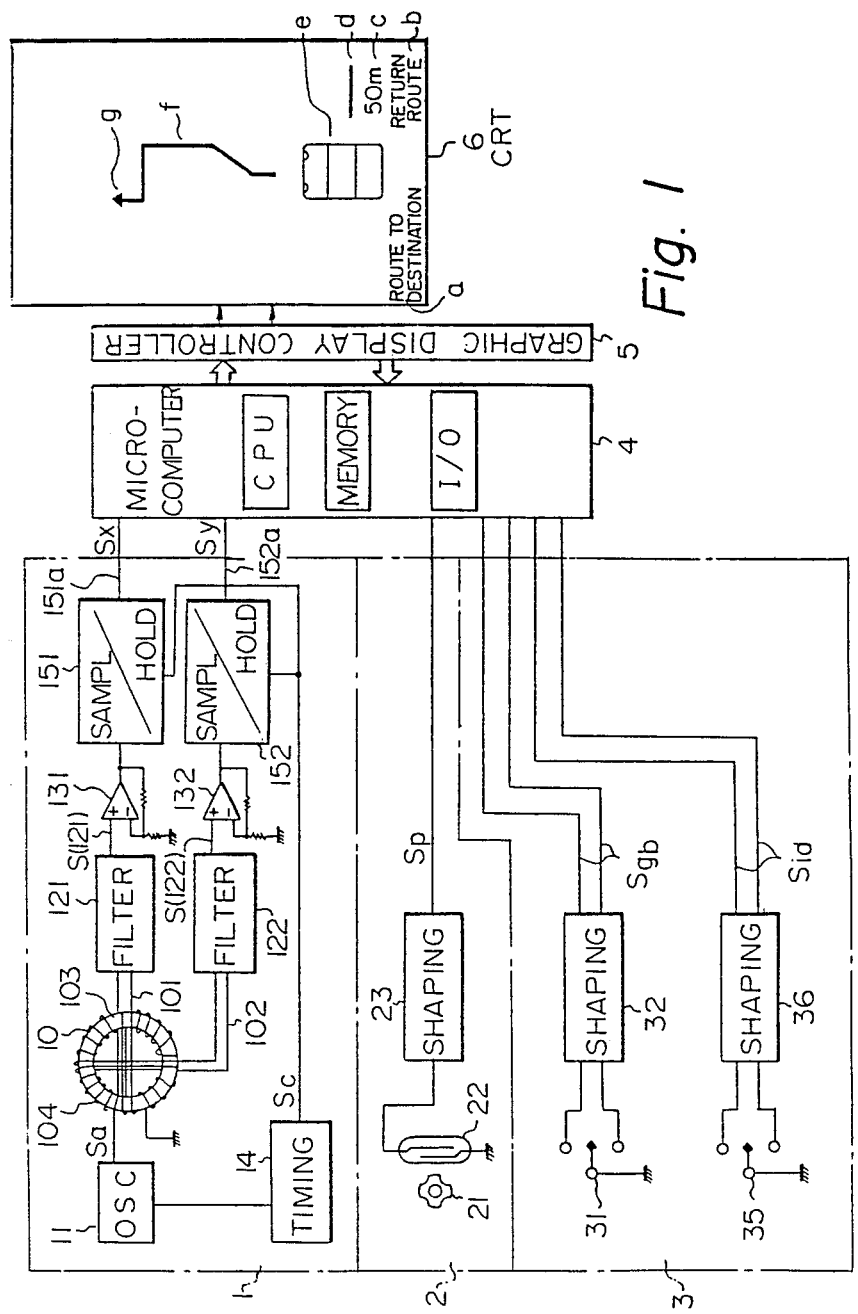
FIG. 1 illustrates a device for indicating information on the return route for an automotive vehicle according to an embodiment of the present invention.

The device for indicating information on the return route for an automotive vehicle illustrated in FIG. 1 includes a direction detecting portion 1, a distance detecting portion 2, a control switch portion 3, a microcomputer 4, a graphic display controller 5, and a CRT 6.

Figure 2:
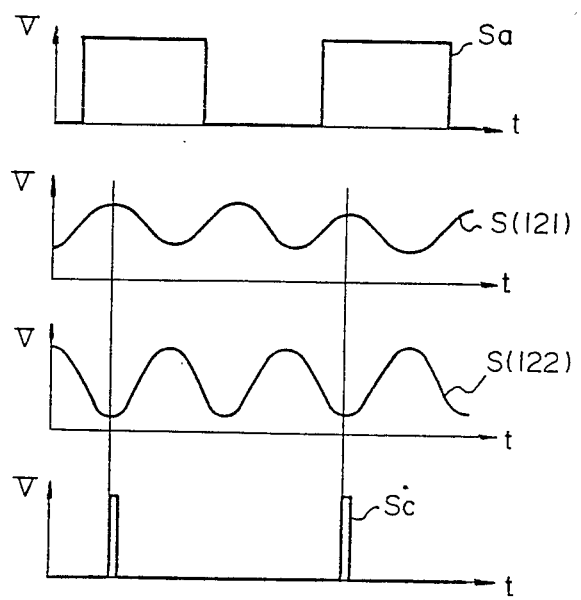
FIG. 2. illustrates the waveforms of the signals appearing in portions of the device of FIG. 1.

A direction detecting sensor 10 in the direction detecting portion 1 includes a magnetic core 103 of ferromagnetic material, an excitation winding 104, and output windings 101 and 102, which output windings are perpendicular to each other. The excitation winding 104 is wound along the circular magnetic path of the magnetic core 103. The output windings 101 and 102 are wound around the magnetic core 103 in crossed diametral directions. An oscillator circuit 11 in the direction detecting portion 1 produces a signal Sa of rectangular waveform, illustrated in FIG. 2, which is supplied to the excitation winding 104 to excite the same with frequency f.

The magnetic field in the magnetic core 103 is changed in accordance with the horizontal component H of terrestrial magnetism acting on the direction detecting sensor 10. Output signals, which are proportional to the difference of magnetic flux in the magnetic core 103, are produced from the output windings 101 and 102. The output signals are supplied to the filters 121 and 122 of the same structure. The filters 121 and 122 produce output signals S(121) and S(122), illustrated in FIG. 2, having the frequency $2f$, which are supplied to and amplified by amplifiers 131 and 132. The amplified signals are supplied to sample and hold circuits 151 and 152 where sampling and holding of the supplied signals are carried out by using a signal Sc from a timing circuit 14 to produce direction detection signals $S_x$ and $S_y$ at terminals 151a and 152a.

The distance detecting portion 2 includes a rotating body 21 of a magnetic type coupled to the rotation of the driving shaft or the wheel of the automotive vehicle, a distance sensor 22 of the reed switch type actuated by the rotation of the N or S pole of the rotating body 21, and a signal shaping circuit 23 for receiving the signal from the distance sensor 22 and producing a distance signal $S_p$.

The control switch portion 3 includes a route discriminaion switch 31, a signal shaping circuit 32 for producing a route discrimination signal $S_{gb}$, a distance increase/decrease discrimination switch 35 as means for correcting the distance, and a circuit 36 for shaping the distance correction signal for detecting the condition of increase/decrease of the distance and producing an increase/decrease signal $S_{id}$.

The microcomputer 4 includes a CPU 41, a memory 42, and an I/0 unit 43. The microcomputer 4 stores the direction detection signals $S_x$ and $S_y$ successively in synchronization with the distance signal $S_p$ on the route to the destination and delivers indication signals $X_j$ and $Y_j$ on the return route on the basis of the same. The microcomputer 4 carries out operations illustrated in the flow charts of FIGS. 3A through 3D.

The graphic display controller 5 generates the signals for controlling the CRT 6 on the basis of the signals supplied from the microcomputer 4. The microcomputer 4 and the graphic display controller 5 can be of the LSI type on the market.

In the operation of the device of FIG. 1, information on the direction of travel of the automotive vehicle is stored at predetermined distances of travel, for example, at 10 meter intervals, in the memory on the route to the destination. Indication of the direction of travel of the vehicle is given at predetermined distances of travel, for example, 10 meters, on the display portion on the return route on the basis of the stored information of the direction and the direction of present travel of the vehicle. Also, in the operation of the device of FIG. 1, the error due to the difference between the distance of travel of on the route to the destination and that on the return route is corrected.

The operation routine of the microcomputer 4 will now be described below with reference to FIGS. 3A through 3D.

Figure 3A:
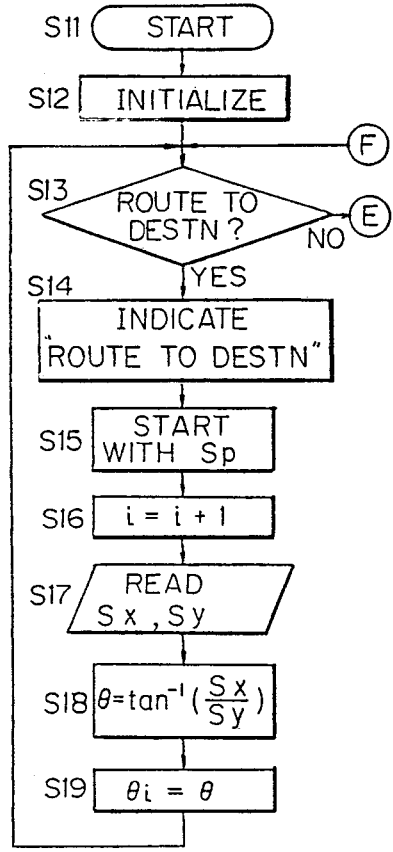
FIGS. 3A through 3D are flow charts of an example of the operation of the device of FIG. 1.

Referring now to FIG. 3A, in step S11, the operation is started upon the start of the engine and switch-on of the power source of the device of the present invention. In step S12, the initial values of variables regarding the device are reset to zero.

In step S13, a decision as to whether the automotive vehicle is in the state of travel to a destination is carried out, on the basis of the signal $S_{gb}$ from the route discrimination switch 31 through the signal shaping circuit 32 (FIG. 1). When the result of the decision is YES, the process proceeds to step S14 and a signal is supplied to the graphic display controller 5 to display "ROUTE TO DESTINATION" on CRT 6 (FIG. 1, a). In step S15, the operation is started with the generation of the distance signal $S_p$. The signal $S_p$ is generated, for example, every 10 meters of travel of the vehicle.

In step S16, the operation timing i is increased by one to proceed to operation timing "i+1". In step S17, the direction detection signals $S_x$ and $S_y$ are read, in synchronization with the distance signal $S_p$. In step S18, the calculation: $\theta = \tan^{-1}(S_x/S_y)$ is carried out. In step S19, the calculated value $\theta$ is stored as the value $\theta_i$.

Thus, on the route to the destination, the value representing the direction of travel of the automotive vehicle is successively calculated at every distance signal $S_p$ corresponding to calculation timing i and stored as the value $\theta_i$.

When the result of the decision in step S13 is NO, the process proceed to step S21 in routine 3B.

Figure 3B:
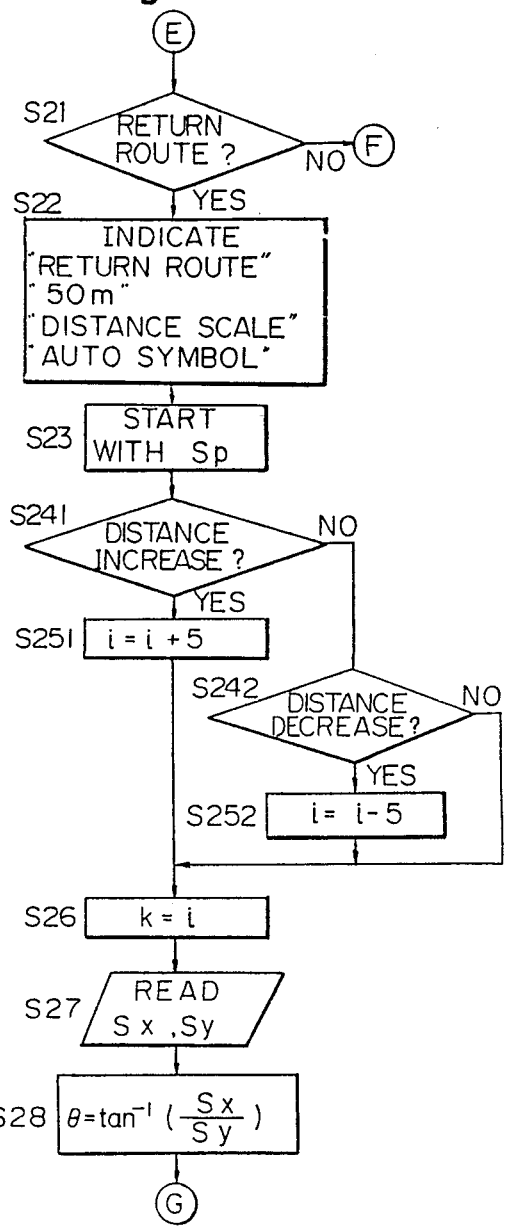

Referring now to FIG. 3B, in step S21, a decision as to whether the automotive vehicle is in the state of return travel is carried out. When the result of the decision is YES, the process proceeds to step S22. In step S22, instruction signals are supplied to the CRT controlling portion 5 so as to display the indication "RETURN ROUTE" (FIG. 1, b), the indication "50 m" (FIG. 1, c), the scale of the distance (FIG. 1, d), and the indication of the vehicle symbol on the CRT 6 (FIG. 1, e).

In step S23, the operation is started with the generation of the distance signal $S_p$. In step S241, a decision as to whether the mode of the device is in the distance increasing mode is carried out. When the result of the decision is YES, the process proceeds to step S251. In step S251, the operation timing number i is increased by 5. In this case, the value $\theta$ of the direction of travel of the automotive vehicle stored on the route to the destination at the point 50 meter greater than the distance of the present point of the vehicle from the starting point is used for the subsequent operation.

When the result of the decision is NO, the process proceeds to step S242. In step S242, a decision as to whether the mode of the device is in the distance decreasing mode is carried out. When the result of the decision is YES, the process proceeds to step S252. In step S252, the operation timing number i is decreased by 5. In this case, the value $\theta$ of the direction of travel of the automotive vehicle stored on the route from to the destination at the point 50 meter less than the distance of the present point of the vehicle from the starting point is used for the subsequent operation.

In step S26, the value K is made equal to the operation timing number i. In step S27, the direction detection signals $S_x$ and $S_y$ are read. In step S28, the calculation $\theta = \tan^{-1}(S_x/S_y)$ is carried out. Thus, the value $\theta$ representing the traveling direction of the automotive vehicle is calculated.

Figure 3C:
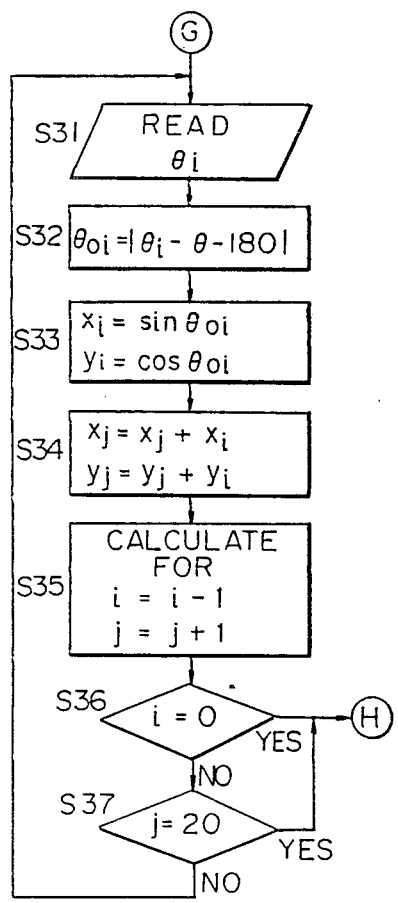

Referring now to FIG. 3C, in step S31, the value $\theta_i$ stored in the memory on the route to the destination is read out from the memory. In step S32, the calculation $\theta_{0i} = |\theta_i - \theta - 180|$ is carried out. The value $\theta_{0i}$ represents the difference of the direction of travel of the automotive vehicle on the return route from that on the route to the destination.

In step S33, the calculation $x_i = \sin\theta_{0i}$ and the calculation $y_i = \cos\theta_{0i}$ are carried out. In step S34, the calculation $x_j = x_{j0} + x_i$, and the calculation $y_j = y_{j0} + y_i$ are carried out. $x_{j0}$ and $y_{j0}$ are the original values for $x_j$ and $y_j$. The information "$x_j$, $y_j$" is used for indicating the traveling direction of the automotive vehicle on the CRT 6.

For example, if the automotive vehicle passes a predetermined point in the north (N) direction on the route to the destination and passes it in the south (S) direction on the return route, the angle $\theta_i$ is equal to 0° and the angle $\theta$ is equal to 180°, hence the angle $\theta_{0i}$ is equal to 360°. Accordingly, the information ($x_j$, $y_j$) for indication on the CRT 6 is (0, 1).

If the automotive vehicle passes a predetermined point in the north (N) direction on the route to the destination and passes it in the west (W) direction on the return route, the angle $\theta_i$ is equal to 0° and the angle $\theta$ is equal to 270°, hence the angle $\theta_{0i}$ is equal to 90°. Accordingly, the information ($x_j$, $y_j$) for indication on the CRT 6 is (1, 0).

In step S35, the operation timing number i is decreased by one and the number j is increased by one, and the calculations of $\theta_{0i}$, $x_i$, $y_i$, $x_j$, and $y_j$ are carried out similarly as steps S31 through S34 on the basis of the new value of $\theta_i$ corresponding to the point which is located at 10 meter in the forward direction of the automotive vehicle. Accordingly, new information ($x_j$, $y_j$) is obtained.

In step S36, a decision as to whether or not i is equal to zero is carried out. When the result of the decision is YES, the process proceeds to step S41 of Routine 3D, while when the result of the decision is NO, the process proceeds to step S37. In step S37, a decision as to whether j is equal to 20 is carried out. When the result of the decision is YES, the process proceeds to step S41 of Routine 3D, while when the result of the decision is NO, the process returns to step S31.

Figure 3D:
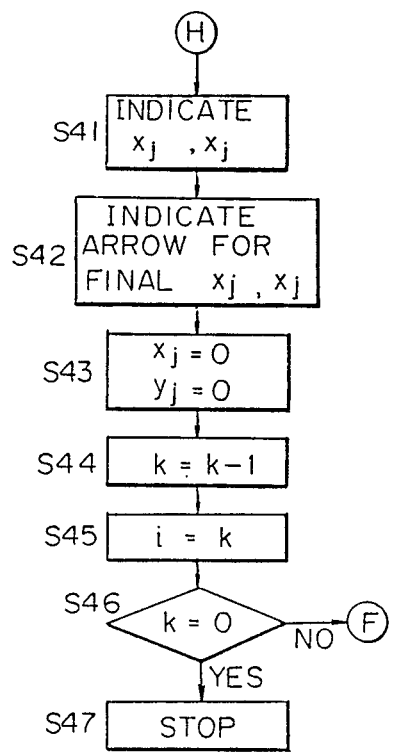

Referring now to FIG. 3D, in step S41, the information ($x_j$, $y_j$) is supplied to the CRT controlling portion 5 for indicating this information on CRT 6 (FIG. 1, f). In step S42, the information of the arrow mark (FIG. 1, g) which is to be added to the final information ($x_j$, $y_j$) is supplied to the CRT controlling portion 5. In step S43, the information ($x_j$, $y_j$) is reset to (0, 0). In step S44, the number K is decreased by one. In step S45, the operation timing number i is made equal to K. The number K is the value of i which is used at the beginning of Routine 3C.

In step S46, a decision as to whether K is equal to zero is carried out. When the result of the decision is NO, the process proceeds to step S13 of Routine 3A. The operation is carried out at every distance signal Sp so that the direction of the automotive vehicle is calculated to the extent of 200 meter in the forward direction. When the result of the decision in step S46 is YES, that is, when the vehicle returns to the starting point, the process proceeds to step S47 where the operation of the device is finished.

In the operation of the device of FIG. 1, if a portion of the return route is different from the corresponding portion of the route to the destination due to, for example, a one-way street, the taking-in of information or the delivery of information is prohibited by placing the route discrimination switch 31 in the neutral position.

Although in the above description, the distance for the distance signal $S_p$ was selected as 10 meter, it will be understood that this distance can be reduced as far as the reduction of the calculation time of the computer is possible. Further, although in the above description, the range for the distance correction was selected as ±50 meter, it will also be understood that this range can be reduced to ±D, the value D being the distance for the distance signal Sp.

Although the preferred embodiment is described heretofore with reference to the drawings, various modifications and alterations are possible without departing from the scope of claim of the present application.

For example, a display device of a light-emitting diode (LED) type or lamp type or a fluorescent indicator tube can be used for the display device instead of the above-described CRT. A gyroscopic device and the like can be used for the device for detecting the direction, instead of the device of detection of terrestrial magnetism.

A flux gate sensor of a different type, a Hall effect element, or the like can be used for the direction detecting sensor 10, instead of the flux gate sensor of ring core type.

The angle signal $\theta$ can be obtained in the form of 2N divisions by the method of level comparison, instead of the method of the calculation $\theta = \tan^{-1}(S_x/S_y)$. The operation of the microcomputer 4 can be carried out in an analog manner by using a comparator circuit, an addition/subtraction circuit, and the like, instead of the above-described digital manner using the microcomputer.

We claim:

1. A device for indicating return route information for an automative vehicle, comprising:
   direction detection means, mounted on the vehicle, for generating a direction signal corresponding to the direction of travel of the vehicle;
   distance detection means for generating a distance signal corresponding to the distance of travel of the vehicle;
   route-to-destination/return-route indication generation means for generating an indication of either the vehicle is enroute to its destination or returning from the destination;
   storing means, responsive to an enroute destination indication by said indication generation means, for successively storing direction signals for each predetermined distance of travel of the vehicle based on the distance signal;
   return route indication signal generation means, responsive to a returning from destination indication by said indication generation means, for generating, per predetermined distance of travel indicated by the distance signal, a signal indicating the return route to be traveled at least to the extent of a predetermined distance in the forward direction on the return-route on the basis of the previously stored direction signals and distance signals; and
   return-route data display means, responsive to the signal from said return-route indication means, for displaying the return-route data at least to the extent of the predetermined distance in the forward direction along the return-route.

2. A device according to claim 1, further comprising correction means for correcting a difference between the distance of travel of the vehicle run on the route to the destination and that on the return-route.

3. A device according to claim 1, further comprising an interruption switch for interrupting the operations of said storing means or said return-route indication means.

4. A device for indicating a return-route for an automotive vehicle, comprising:
   direction detection means, mounted on the vehicle, for generating a direction signal corresponding to the direction of travel of the vehicle;
   distance detection means for generating a distance signal corresponding to the distance of travel of the vehicle;
   a route-to-destination/return-route indication means for generating an indication of either that the vehicle is enroute-to-destination or traveling a return-route from the destination;
   operation timing number generating means for generating an operation timing number corresponding to each unit of distance traveled, as indicated by said distance signal, along the vehicle's route to destination;
   storage means for storing direction signals and operation timing numbers;
   means, responsive to a route-to-destination indication by said indication generation means, for causing the successive storing by said storage means of direction signals from said direction detection means along with an operation timing number corresponding to each direction signal stored, the timing number indicating the order of storage from the start of the travel enroute to the destination, per predetermined distance of travel, on the basis of the distance signal from said distance detection means;
   index number generating and changing means, responsive to a return route indication from said indication means, for successively changing an index number for indicating the present location on return-route on the basis of the distance signal from said distance detection means;
   return-route indication signal generation means for successively reading from said storage means previously stored direction signals having timing numbers corresponding to index numbers thereby finding the route to be traveled on the return-route on the basis of said direction and distance signals; and
   return-route data display means, responsive to the signal from said return-route indication means, for displaying the return route data at least to the extent of the predetermined distance in forward direction of the vehicle on the return-route.

5. A device according to claim 4, further comprising: correction means for changing said index number so as to correct the difference between the distance of travel of the vehicle run on the route to the destination and that on the return-route.

6. A device according to claim 5, wherein said correction means comprises a switch means for changing said index number.

* * * * *